United States Patent
Fishwick et al.

(10) Patent No.: US 9,106,788 B2
(45) Date of Patent: Aug. 11, 2015

(54) OBJECT TRACKING USING MOMENTUM AND ACCELERATION VECTORS IN A MOTION ESTIMATION SYSTEM

(75) Inventors: Steven John Fishwick, Herts (GB); Stephen Morphet, Herts (GB)

(73) Assignee: Imagination Technologies Limited, Kings Langley (GB)

(*) Notice: Subject to any disclaimer, the term of this patent is extended or adjusted under 35 U.S.C. 154(b) by 881 days.

(21) Appl. No.: 12/660,934

(22) Filed: Mar. 5, 2010

(65) Prior Publication Data
US 2010/0271484 A1   Oct. 28, 2010

(30) Foreign Application Priority Data
Apr. 23, 2009   (GB) .................................. 0907039.2

(51) Int. Cl.
H04N 5/14   (2006.01)
G06T 7/20   (2006.01)

(52) U.S. Cl.
CPC .............. *H04N 5/145* (2013.01); *G06T 7/2026* (2013.01); *G06T 2207/10016* (2013.01)

(58) Field of Classification Search
CPC .............................. G06T 7/2026; H04N 5/145
USPC ....................................... 348/169; 375/240.15
See application file for complete search history.

(56) References Cited

U.S. PATENT DOCUMENTS

| | | | |
|---|---|---|---|
| 6,278,736 B1 | 8/2001 | De Haan et al. | |
| 2004/0190623 A1* | 9/2004 | Lunter | 375/240.16 |
| 2005/0063467 A1* | 3/2005 | Hekstra et al. | 375/240.16 |
| 2005/0141614 A1* | 6/2005 | Braspenning et al. | 375/240.16 |
| 2005/0180506 A1* | 8/2005 | Wittebrood et al. | 375/240.16 |
| 2005/0243926 A1 | 11/2005 | Hubrich et al. | |
| 2006/0159177 A1 | 7/2006 | Mellot | |
| 2007/0297510 A1 | 12/2007 | Herpel et al. | |
| 2008/0205779 A1* | 8/2008 | Dogaru | 382/238 |
| 2010/0149422 A1* | 6/2010 | Samuelsson et al. | 348/699 |

FOREIGN PATENT DOCUMENTS

| | | |
|---|---|---|
| EP | 1 592 248 A1 | 11/2005 |
| EP | 1 610 560 A1 | 12/2005 |

OTHER PUBLICATIONS

Notification of Transmittal of International Search Report and Written Opinion of International Search Authority dated Aug. 5, 2010 (3 pages).
International Search Report dated Aug. 5, 2010 (4 pages).
Written Opinion of the International Searching Authority (7 pages).

\* cited by examiner

*Primary Examiner* — David X Yi
(74) *Attorney, Agent, or Firm* — Vorys, Sater, Seymour and Pease LLP; Vincent M DeLuca

(57) ABSTRACT

A method and apparatus for motion estimation in a sequence of video images involves a) subdividing each field or frame of a sequence of video images into a plurality of blocks, b) assigning to each block in each video field or frame a respective set of candidate motion vectors, c) determining for each block in a current video field or frame, which of its respective candidate motion vectors produces a best match to a block in a previous video field or frame, d) forming a motion vector field for the current video field or frame using the thus determined best match vectors for each block, and e) forming a further motion vector field by storing a candidate motion vector derived from the best match vector at a block location offset by a distance derived from the candidate motion vector.

18 Claims, 10 Drawing Sheets

A typical block matching motion estimator.

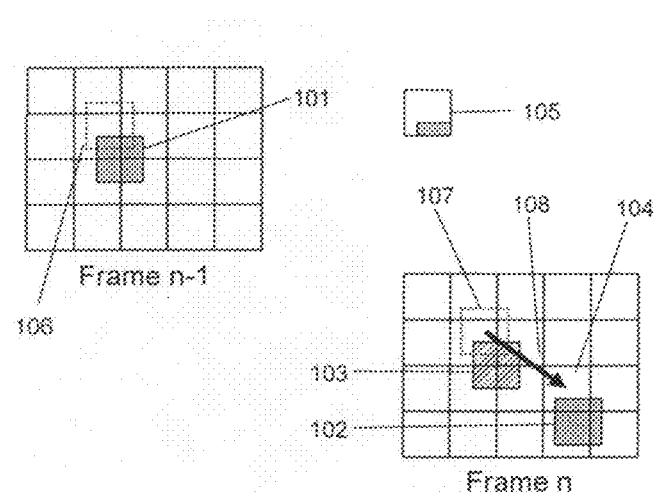
Figure 1 - A typical block matching motion estimator.
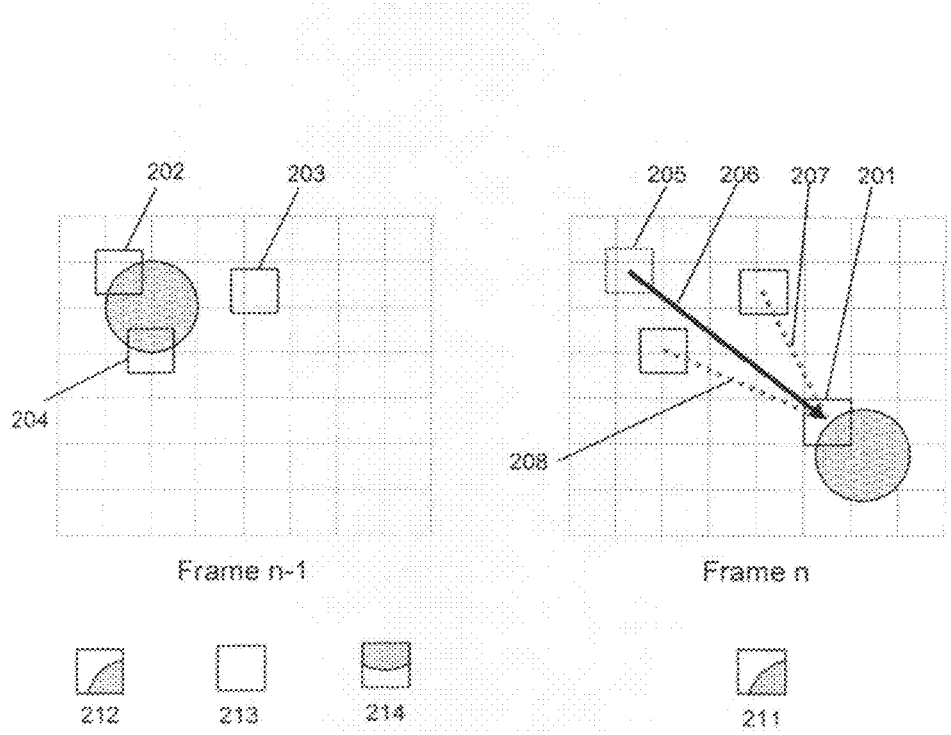
Figure 2 - Choosing a vector from a set of candidates.

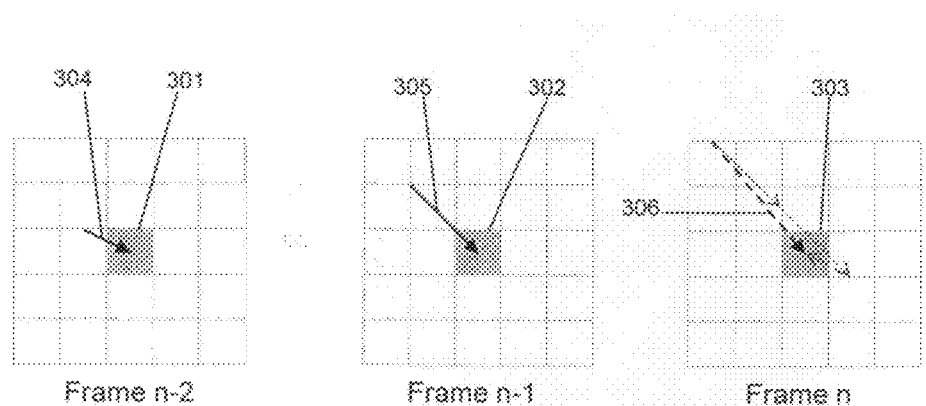
Figure 3 - Accelerator motion vector in enhanced predictive zonal search.
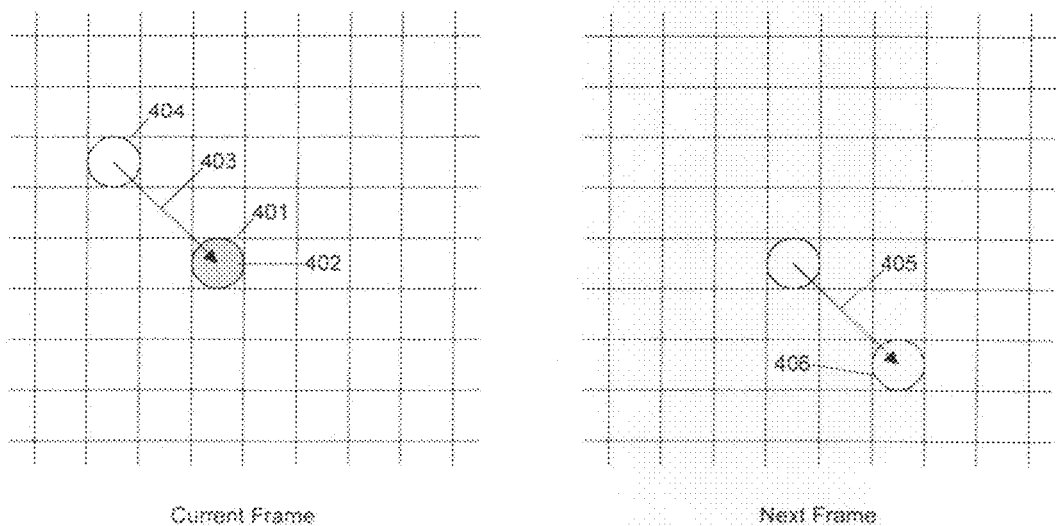
Figure 4 - Spatially offset momentum vector candidate

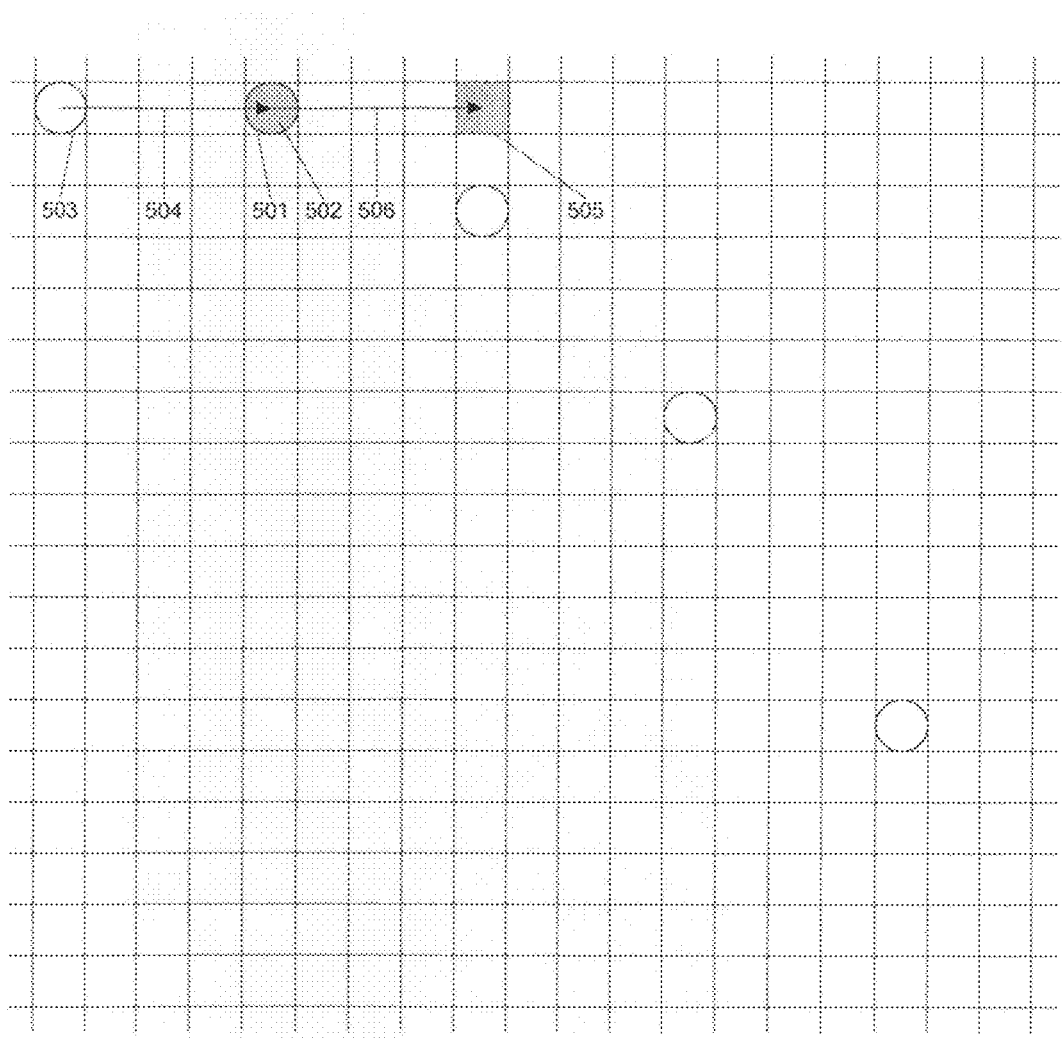
Figure 5 - Acceleration candidates (Step 1)

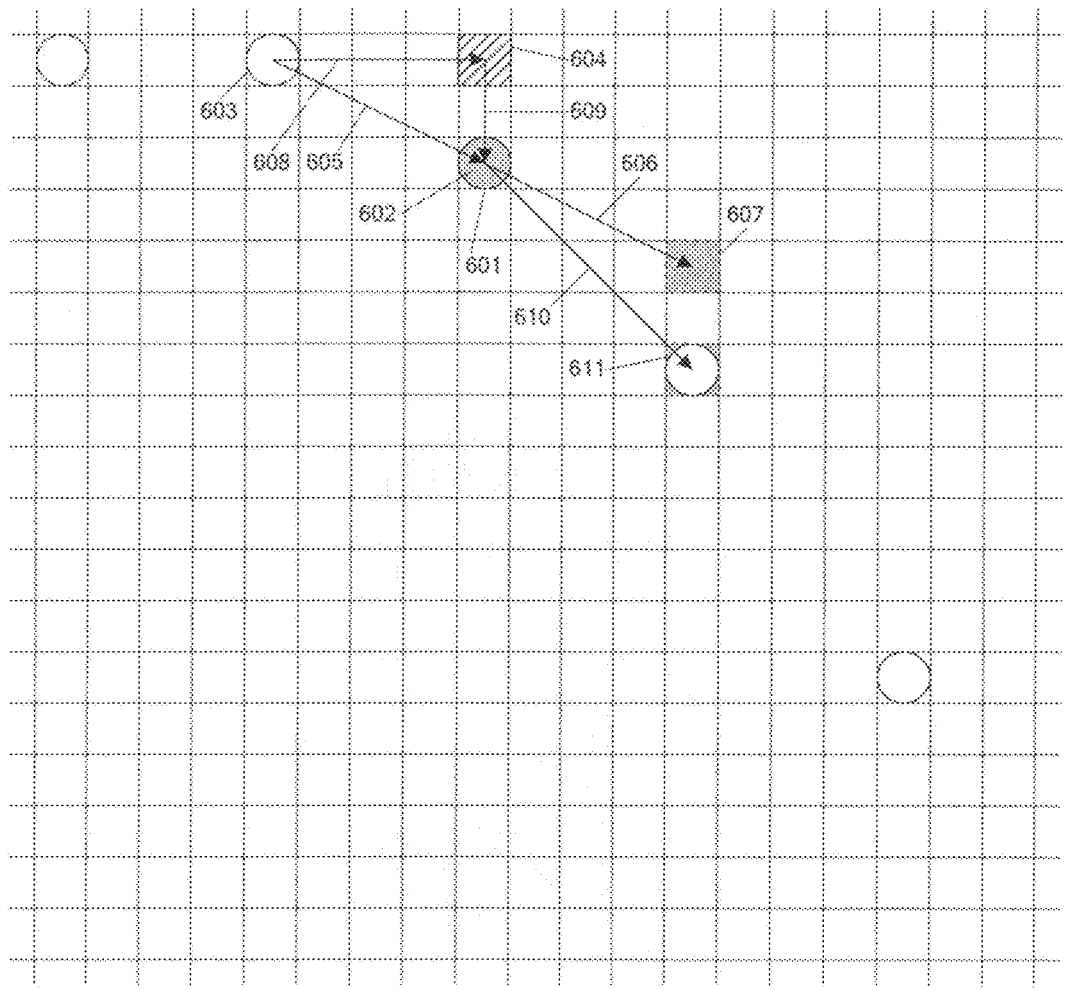
Figure 6 - Acceleration candidates (Step 2)

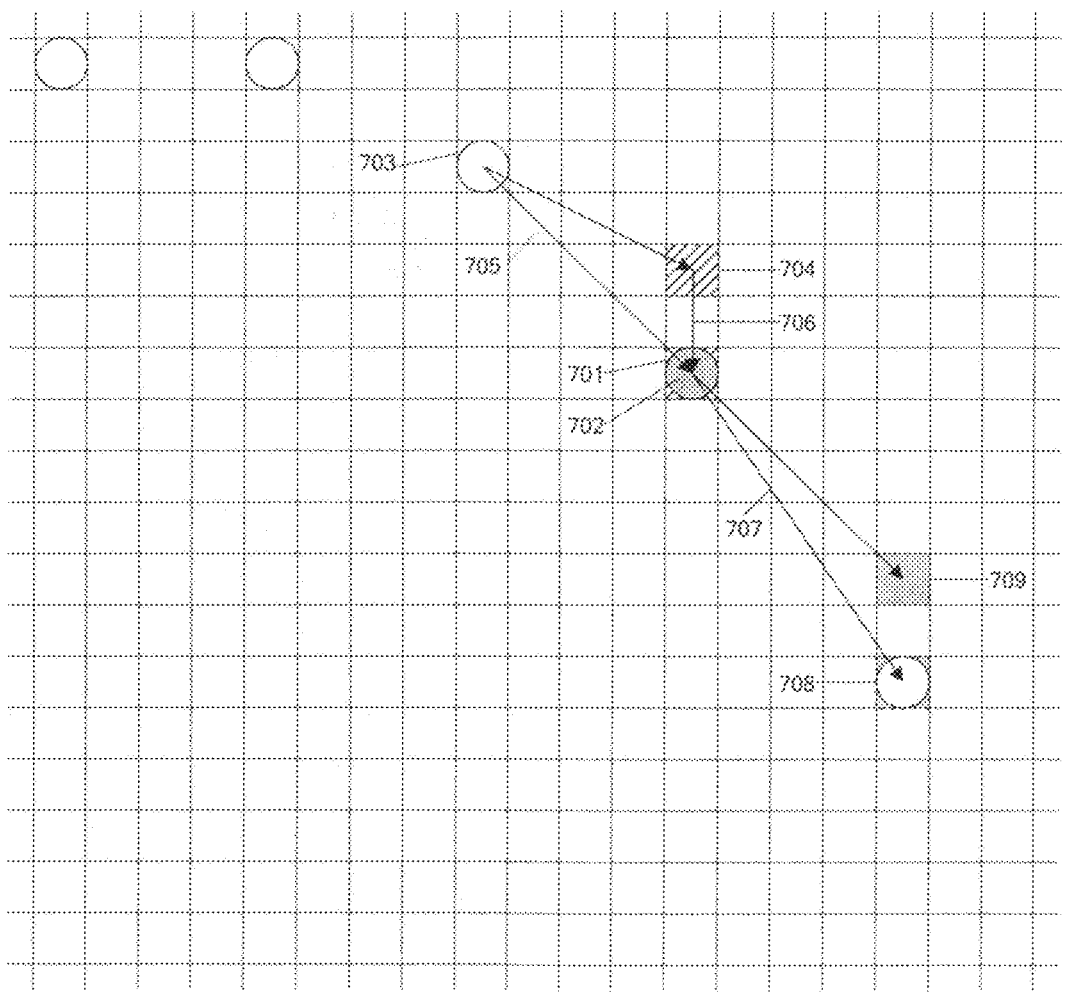
Figure 7 - Acceleration candidates (Step 3)

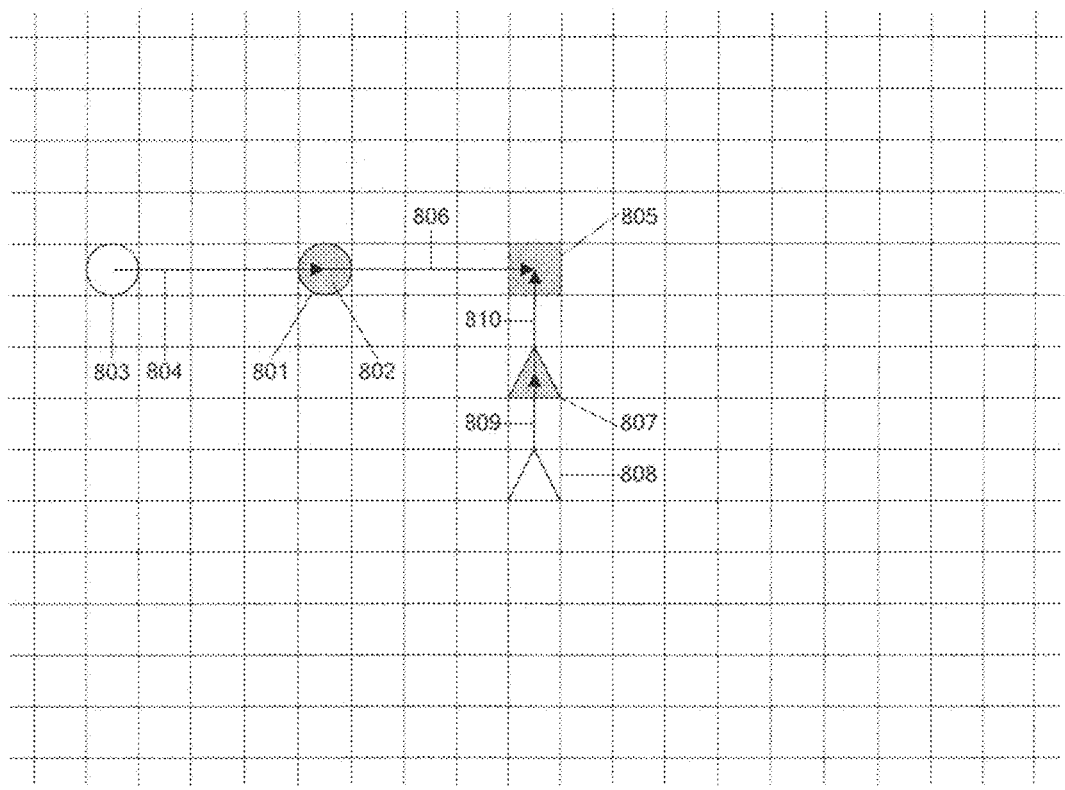
Figure 8 - Generation of multiple momentum candidates at a single location

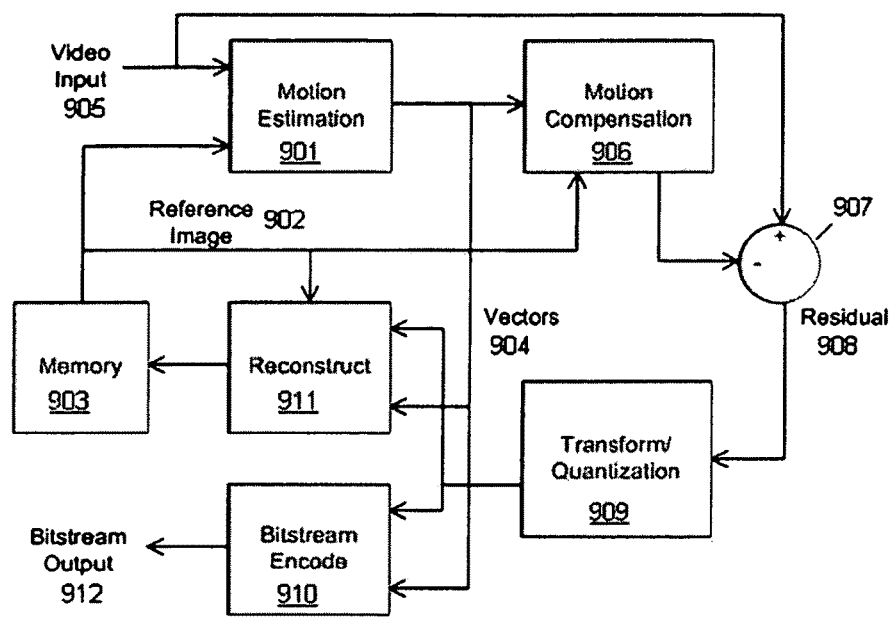
Figure 9 - Block diagram showing motion estimation used in a typical video encoder application

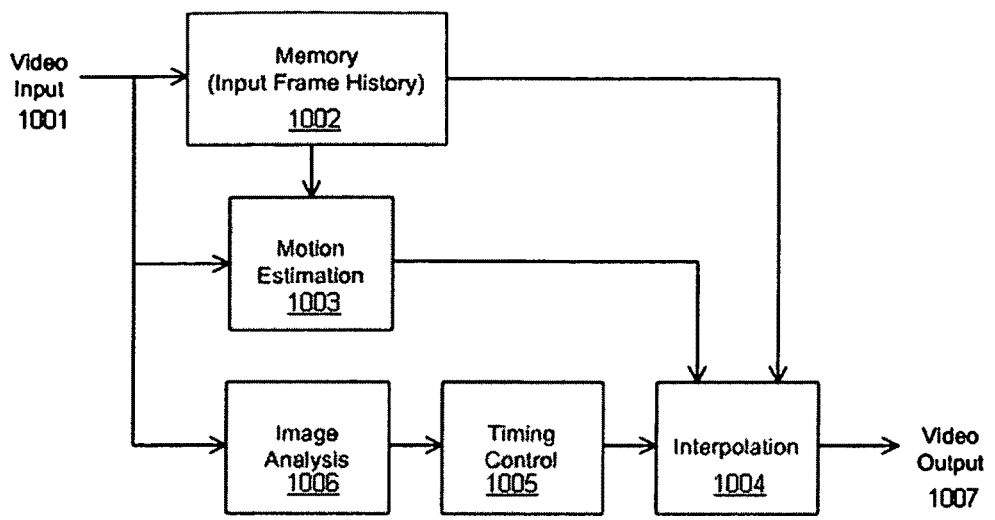
Figure 10 - Block diagram showing motion estimation used in a typical frame rate conversion application

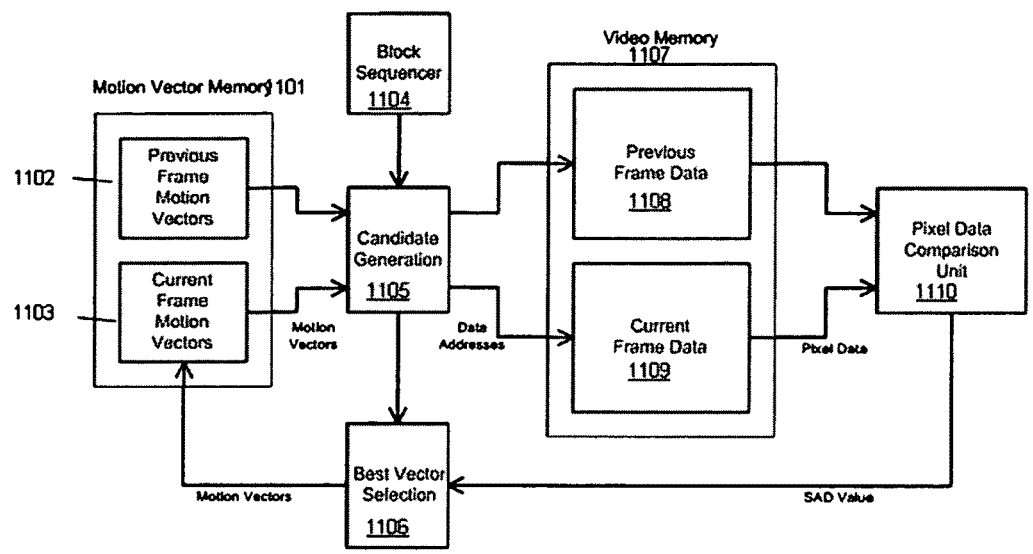
Figure 11 - Block diagram of a conventional block based motion estimator

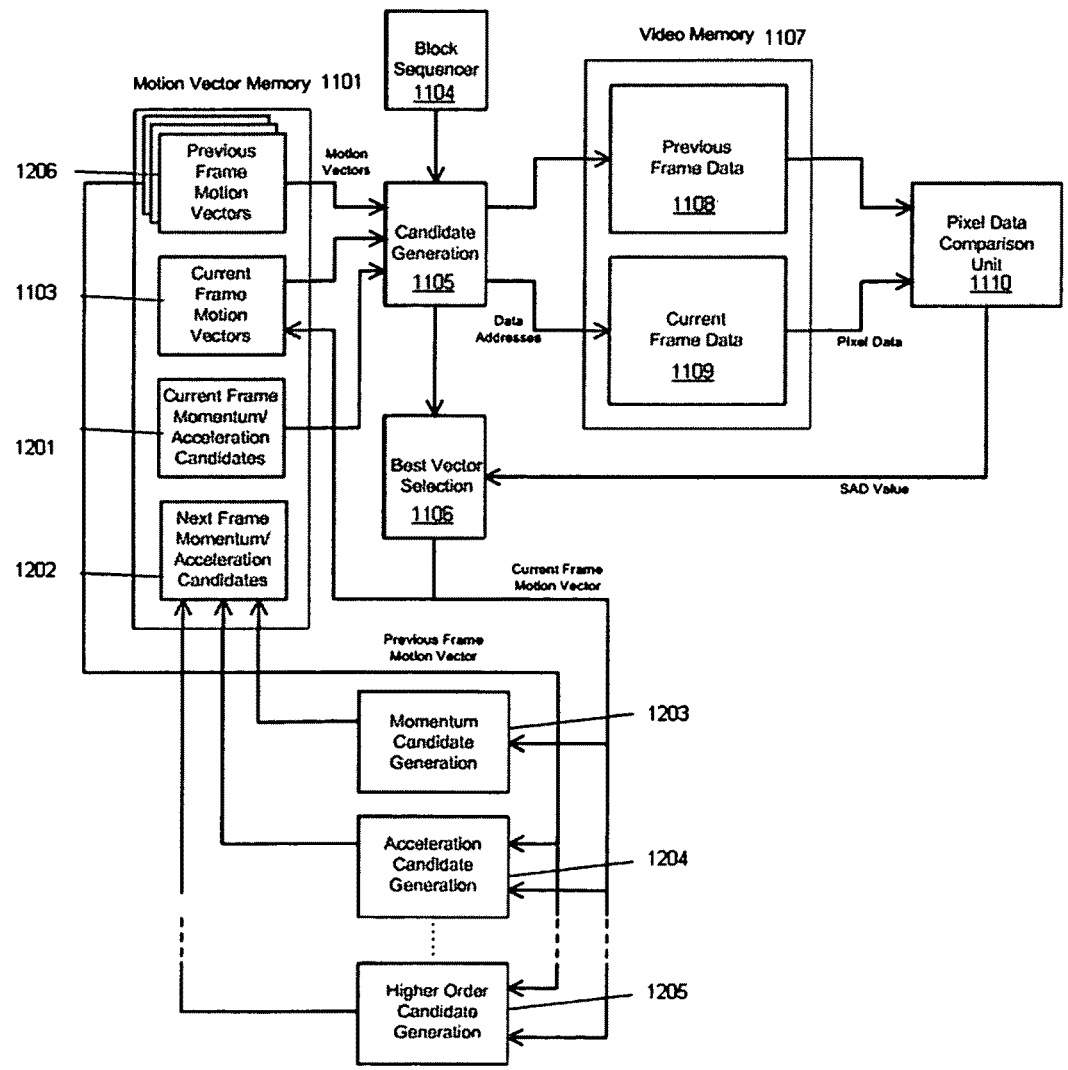
Figure 12 - Block diagram of a motion estimator with momentum and acceleration candidates

OBJECT TRACKING USING MOMENTUM AND ACCELERATION VECTORS IN A MOTION ESTIMATION SYSTEM

This invention relates to block based motion estimation systems, in particular to methods associated with producing candidate motion vectors which consider the physical nature of the real world in order to identify true motion.

BACKGROUND TO THE INVENTION

Identification of motion in video sequences using block based matching techniques is well known. These methods generally consider two consecutive frames from the video sequence and subdivide them into multiple regions known as blocks or macroblocks. In a motion search procedure, each block is compared with pixel data from various candidate locations in the previous frame. The relative position of the best match gives a vector that describes the motion in the scene at that block position. Collectively, the set of motion vectors at each block position in a frame is known as the motion vector field for that frame. Note that use of the term "vector field" should not be confused with the use of "field" or "video field" to describe the data in an interlaced video sequence, as described below.

Video sequences typically comprise a series of non interlaced frames of video data, or a series of interlaced fields of video data. The interlaced sequences are produced by fields which carry data on alternate lines of a display, such that a first field will carry data for alternate lines, and a second field will carry data for the missing lines. The fields are thus spaced both temporally and spatially. Every alternate field in a sequence will carry data at the same spatial locations.

FIG. 1 illustrates a typical example of a block matching motion estimator. In all the figures, including FIG. 1, motion vectors are shown with the head of the arrow at the centre of the block to which the vector corresponds. The frames are divided into blocks, and an object 101 in the previous frame has moved to position 102 in the current frame. The previous position of the object is shown superimposed on the current frame as 103. Motion estimation is performed for blocks rather than for objects, where a block of pixels in the current frame is matched with a block sized pixel area in the previous frame which is not necessarily block aligned. For example, block 104 is partially overlapped by the moving object 102, and has contents as illustrated at 105. Motion estimation for block 104, if it performs well, will find the pixel data area 106 in the previous frame, which can also be seen to contain the pixels illustrated in 105, i.e. a good match has been found. Superimposed back onto the current frame, the matching pixel data area is at 107. The motion vector associated with block 104 is therefore as illustrated by arrow 108.

Many block based motion estimators select their output motion vector by testing a set of motion vector candidates with a method such as a sum of absolute differences (SAD) or mean of squared differences (MSD), to identify motion vectors which give the lowest error block matches. FIG. 2 illustrates the candidate evaluation process for the block 201 in the current frame which has pixel contents shown in 211. In this simple example system, three motion vector candidates 206, 207 and 208 are considered which correspond to candidate pixel data areas at locations 202, 203 and 204 in the previous frame. The pixel contents of these pixel data areas can be seen in 212, 213 and 214 respectively. It is apparent that the pixel data at location 202 provides the best match for block 201 and should therefore be selected as the best match/lowest difference candidate. Superimposed back onto the current frame, the matching pixel data area is at 205 and the associated motion vector is 206.

Different systems have different requirements of the motion estimation. In a video encoder, the requirement is to form the most compact representation of a frame, by reference to a previous frame from the sequence. The requirement is generally to find motion vectors which give the lowest error block matches, and while the resulting motion vectors are usually representative of the actual motion of objects in the scene, there is no requirement that this is always the case. In other applications, such as de-interlacing or frame rate conversion, it is more important that the motion vectors represent the true motion of the scene, even if other distortions in the video mean that the block matches do not always give the lowest error. By applying appropriate constraints to the candidate motion vectors during motion search, the results can be guided towards "lowest error" or "true motion" as necessary.

Motion vectors are known to be highly correlated both spatially and temporally with vectors in adjacent blocks, so these neighbouring vectors are often used as the basis for the candidates in the motion estimator. A random element may also be incorporated into the candidates to allow the system to adapt as the motion in the video changes. Where a block has motion that is not simply predicted by its neighbours, a conventional system relies on random perturbation of vector candidates. This works well for slowly changing vector fields, but tends not to allow the motion estimator to converge rapidly to a new vector where it is very different to its neighbours. A system relying on randomness may wander towards the correct motion over time, but is prone to becoming stuck in local minima, or converging so slowly that the motion has changed again by the time it gets there. The number of candidate motion vectors tested for each block is often a compromise between choosing a set large enough to identify true motion and/or provide good matches with a low residual error, while being small enough to minimize computational expense.

The present invention presents an efficient method of generating candidate motion vectors that are derived from the physical momentum and acceleration present in real world objects. As such, they are highly likely to be representative of the true motion of the scene. Such candidates may be unavailable through other vector propagation techniques using temporally and spatially derived candidates, and provide a more efficient method of tracking motion and adapting to changing motion than a system that relies entirely on randomness. The present invention may not remove the need for randomness entirely, but a single candidate motion vector that predicts the motion accurately is clearly better than several random guesses which may or may not select the correct vector. The present invention may allow fewer random candidates to be used or, more likely, to allow faster convergence in areas of rapid or changing motion.

Many motion estimations (e.g. de Haan et al. True-Motion Estimation with 3-D Recursive Search Block Matching, IEEE Transactions on Circuits and Systems for Video Technology, Vol. 3, No. 5, October 1993) use a temporal vector as one of the candidate motion vectors in the motion estimator. The temporal vector candidate is taken from a block in the same position, or in a similar position, to the current block, but using the motion estimation result that was derived for that block during the motion estimation processing of a previous frame. The use of the temporal vector candidate is based on the assumption that objects are larger than blocks and that if an object at a certain block location is moving with a particular velocity in the past then new content arriving in the block is likely to continue to move with the same speed and direction. The assumption of continuing motion is reasonable because objects in the real world exhibit the physical property of momentum, and so the temporal vector provides a useful candidate motion vector.

The concept of block acceleration has also been used in the prior art, for example, to generate predictors for a static block location in the Enhanced Predictive Zonal Search (EPZS) technique in MPEG-4 video encoding. In this method, a block's acceleration is calculated by considering the differentially increasing/decreasing motion vectors present at a fixed block location over two frames and storing the resulting 'accelerator motion vector' in the same block position for use in the following frame. FIG. 3 illustrates the formation of an 'accelerator motion vector', 306, for block 303 in the current frame. Blocks 303, 302 and 301 are at the same spatial block location in the current frame, previous frame and the frame before that respectively and can therefore be said to be co-located. The differential acceleration of the co-located block can be seen to be the sum of the motion vector 305 from frame n−1, and the differential change in motion between the frames n−1 and n−2. The vector 306 is therefore given by two times the vector 305, minus the vector 304.

SUMMARY OF THE INVENTION

According to a first aspect of the invention, there is provided a method for motion estimation in a sequence of video images, comprising the steps of: a) subdividing each field or frame of a sequence of video images into a plurality of blocks; b) assigning to each block in each video field or frame a respective set of candidate motion vectors; c) determining for each block in a current video field or frame, which of its respective candidate motion vectors produces a best match to a block in a previous video field or frame; d) forming a motion vector field for the current video field or frame using the thus determined best match vectors for each block; e) forming a further motion vector field by storing a candidate motion vector derived from the best match vector at a block location offset by a distance derived from the candidate motion vector; and f) repeating steps a) to e) for a video field or frame following the current video field or frame, wherein the set of candidate motion vectors assigned at step b) to a block in the following video field or frame includes the candidates stored at that block location at step e) during the current video field or frame.

The description of this invention is given in terms of a motion estimation system operating on a non-interlaced, or progressive, video signal, in which the video comprises a series of full frames of data. Motion estimation is also commonly performed on interlaced video where the video comprises a series of fields. The principles of this invention are equally applicable to motion estimators operating on both non-interlaced and interlaced video. Accordingly, the term "field or frame" or "video field or frame" covers motion estimation on both an interlaced and a non-interlaced video signal. If the term "frame" is used, it should be interpreted as "field or frame", that is to say, to cover both motion estimation performed on a non-interlaced video signal and an interlaced video signal.

The terms "current", "previous" and "following" are relative terms used simply to indicate the sequential order of frames or fields in the video signal. A "previous" field or frame can be any number of frames earlier than a "current" field or frame; it does not necessarily need to be immediately before the "current" field or frame, although in practice it often will be. A "following" field or frame can be any number of frames later than a "current" field or frame; it does not necessarily need to be immediately after the "current" field or frame, although in practice it often will be.

Preferred embodiments of the present invention provide a method which enables a block or tile based motion estimator to improve its accuracy by introducing true motion vector candidates derived from the physical behaviour of real world objects. Momentum and acceleration vector candidates are calculated which are expected to be representative of the motion of an object during the next frame period. Rather than storing these vectors at the current block location of the object, the vectors are relocated to the block to which it is predicted that the object will have moved. In this way, object motion is tracked, and the vector candidates available to the motion estimator at a particular position include predictions based on the motion of objects predicted to have arrived in that position.

In one embodiment, the candidate motion vector stored at step e) is derived from the best match vector, and predicts a future position and motion of an object in the sequence of video images that continues to travel with unchanged velocity.

In another embodiment, the candidate motion vector stored at step e) is further derived from a vector from each of one or more of the motion vector fields previously formed at step d).

In that embodiment, the candidate motion vector stored at step e) may be derived from the best match vector and a vector from one motion vector field previously formed at step d), and predicts a future position and motion of an object in the sequence of video images that has a velocity changing at a constant rate.

Alternatively, in that embodiment, the candidate motion vector stored at step e) may be derived from the best match vector and a vector from more than one of the motion vector fields previously formed at step d), and predicts a future position and motion of an object in the sequence of video images where a derivative of the velocity of the object is changing at a constant rate.

In that embodiment, preferably, each vector from a previous motion vector field is fetched by: stepping backwards through a sequence of previous motion vector fields, and at each step, fetching a vector from a location offset backwards by a distance derived from the motion vector fetched from the current motion vector field in the sequence.

In that case, the motion vector fetched from the current motion vector field in the sequence may point to a location not aligned with a block, and the offset backwards location is derived by rounding the location not aligned with a block to the nearest block.

Alternatively, in that case, the motion vector fetched from the current motion vector field in the sequence may point to a location not aligned with a block, and the vector fetched from the offset backwards location in the previous motion vector field is interpolated from the vectors at whole block positions.

The method may further comprise storing multiple candidate motion vectors at each offset block location. This may result since vector fields are not uniform and motion vectors may diverge in some areas and converge in others.

The multiple candidate motion vectors may be stored at each offset block location using a priority system. This is useful when there is limited storage space for each offset block location and there is not enough storage space to store every motion vector that is written to a particular offset block location. In a practical system, it is more likely that only a small number of candidate motion vectors can be stored at a given block location.

Preferably, the priority system includes: storing a metric representing the quality of the best match obtained in step c) at the offset block location for the candidate motion vector derived from that best match vector and stored at step e); and selecting the candidate motion vector for storing according to the stored quality metric, such that the candidate motion vectors selected for storing are the vectors having stored quality metrics indicating highest reliability.

The step of selecting the candidate motion vector for storing may comprise comparing the quality of the best match vector determined for each of the candidate motion vectors. The step of comparing may comprise comparing sum of absolute differences (SAD) values used for determining each best match vector. Alternatively, the step of comparing may comprise comparing mean of squared differences (MSD) values used for determining each best match vector. Alternatively, the step of comparing may comprise comparing any other suitable measure of the quality of a vector.

In one arrangement, at step e), the candidate motion vector points to a location not aligned with a block, and the offset block location at step e) is derived by rounding the location not aligned with a block to the nearest block. In a practical system, the candidate motion vector will not generally point to a location that is aligned to a whole block position. Rounding the location to the nearest block is generally sufficient to track object movements.

In another arrangement, at step e), the candidate motion vector points to a location not aligned with a block but close to block boundaries, and the offset block location at step e) comprises more than one block location adjacent to the boundaries.

According to another aspect of the invention, there is provided apparatus for motion estimation in a sequence of video images, comprising: means for subdividing each field or frame of a sequence of video images into a plurality of blocks; means for assigning to each block in each video field or frame a respective set of candidate motion vectors; means for determining for each block in a current video field or frame, which of its respective candidate motion vectors produces a best match to a block in a previous video field or frame; first means for forming a motion vector field for the current video field or frame using the thus determined best match vectors for each block; and second means for forming a further motion vector field by storing a candidate motion vector derived from the best match vector at a block location offset by a distance derived from the candidate motion vector, wherein, when the apparatus operates on a video field or frame following the current video field or frame, the set of candidate motion vectors assigned at the assigning means to a block in the following video field or frame includes the candidates stored at that block location at the second forming means during the current video field or frame.

The candidate motion vector stored at the second forming means may be derived from the best match vector, and predicts a future position and motion of an object in the sequence of video images that continues to travel with unchanged velocity.

Alternatively, the candidate motion vector stored at the second forming means may be further derived from a vector from each of one or more of the motion vector fields previously formed at the first forming means.

In that case, the candidate motion vector stored at the second forming means may be derived from the best match vector and a vector from one motion vector field previously formed at the first forming means, and predicts a future position and motion of an object in the sequence of video images that has a velocity changing at a constant rate. Alternatively, the candidate motion vector stored at the second forming means may be derived from the best match vector and a vector from more than one of the motion vector fields previously formed at the first forming means, and predicts a future position and motion of an object in the sequence of video images where a derivative of the velocity of the object is changing at a constant rate.

Features described in relation to one aspect of the invention may also be applicable to the other aspect of the invention.

BRIEF DESCRIPTION OF THE DRAWINGS

Preferred embodiments of the invention will now be described in detail by way of example, with reference to the accompanying drawings in which:

FIG. 1 illustrates a typical block matching motion estimator;

FIG. 2 illustrates how a block matching motion estimator selects a 'best' motion vector from a set of candidate motion vectors by comparison of the corresponding pixel blocks;

FIG. 3 illustrates how an accelerator motion vector is generated in an enhanced predictive zonal search system;

FIG. 4 illustrates how a spatially offset momentum vector is generated in an embodiment of the proposed system;

FIG. 5 illustrates the first step in the generation and use of an acceleration vector candidate;

FIG. 6 illustrates a second step in the generation and use of an acceleration vector candidate;

FIG. 7 illustrates a third step in the generation and use of an acceleration vector candidate;

FIG. 8 illustrates a situation in which multiple momentum candidates are generated, that need to be stored at the same location;

FIG. 9 shows a block diagram of a typical video encoder, showing a common application for a motion estimation module;

FIG. 10 shows a block diagram of a typical frame rate converter, showing a common application for a motion estimation module;

FIG. 11 shows a block diagram of a conventional motion estimation module, without momentum and acceleration candidates; and FIG. 12 shows a block diagram of motion estimation module with momentum and acceleration candidate generation embodying the invention.

DETAILED DESCRIPTION OF PREFERRED EMBODIMENTS

In all the figures, motion vectors are shown with the head of the arrow at the centre of the block to which the vector corresponds. The input to each block in a block based motion estimator is a limited set of candidate motion vectors which attempt to predict the motion of the object(s) present in the block. The motion estimator compares the pixels of each block in the current frame with pixel data areas defined by a spatial offset equal to each candidate motion vector in the previous frame. These pixel data areas are of block size but are not necessarily constrained to being block aligned. The vector selection process is illustrated in FIG. 2 where the block areas corresponding to each motion vector candidate are compared using a metric such as a sum of absolute differences (SAD) or mean squared difference (MSD). The vector chosen to represent the motion at a block is the candidate motion vector that gives the best score using the chosen metric. Finding good matches relies on the set of candidate vectors including either the true motion vector of an object present in the block or a candidate that results in a good block match (depending on the application requirements). Momentum and acceleration vectors are proposed as a novel route to generating true motion vector candidates and therefore improving the quality and accuracy of the motion estimation.

A 'momentum candidate' is proposed as a motion vector candidate worthy of consideration on the premise that an object detected in a block will continue to move as it has in the past. Real world objects have mass and therefore move with momentum and acceleration defined by known physical laws. This 'real world' motion persists when the objects are observed in video sequences. Unlike conventional techniques which consider momentum/acceleration to be a property of a frame location and evaluate candidates at a fixed block position, the proposed invention generates motion vector candidates for the object being tracked directly and positions them at spatially disparate locations. This spatially offset candidate generation allows motion prediction to track objects within a frame and provide otherwise unavailable candidate motion vectors.

FIG. 4 illustrates how a momentum candidate is generated. A block 401, contains an object, 402. The position of the object in the previous frame is also shown, in pixel area 404. During motion estimation for block 401 the system selects a motion vector 403 from its set of candidate vectors. This motion vector reflects the motion of the object, from pixel area 404 to block 401 during the previous frame interval. This vector suggests that any object moving with constant velocity and present in block 401 in the current frame is likely to have moved into block 406 in the next frame. Provided the object does continue to move with the same velocity, then a motion vector 405, equal in size and direction to 403 but spatially offset, is a good prediction for continuing motion. This vector candidate predicts that the object currently in block 401 will continue to move into block 406 in the next frame. A copy of the vector selected by motion estimation in block 401 is therefore stored in memory, at a position corresponding to block 406, which is the destination block reached when offsetting the position of the current block 401 by the value of the vector itself. This spatially offset copy of the selected vector, shown as 405, is termed the momentum candidate and will be read from the memory and used as a candidate motion vector in motion estimation for block 406 in the next frame.

A further development of the momentum candidate method is to extend it to higher orders, for example, to consider not only constant motion, but also rates of change of motion. A logical step is to create an 'acceleration candidate', although higher order differentials are also possible. Note that the term 'acceleration candidate' is used here to indicate a motion vector candidate that has been derived using the rate of change of motion, rather than a candidate whose vector represents the acceleration of an object directly. A first order acceleration candidate considers the motion history of an object over two frames in order to determine a rate of change of velocity. This first order acceleration candidate can predict the motion of an object whose motion is changing at a constant rate, as is commonly observed in real world scenes.

FIGS. 5 to 7 illustrate the motion of an object along a curved path, showing the generation and use of momentum and acceleration candidate vectors. FIG. 5 shows a block 501, containing an object, 502, which is shown shaded to indicate the position of the object in the current frame. The position of the object in past and future frames is also shown, with the position of the object in the previous frame being pixel area 503. Motion estimation for block 501, assuming that it is accurate, produces the motion vector 504, which correctly represents the movement of the object, from pixel area 503 in the previous frame to block 501 in the current frame. A momentum candidate vector identical to the motion vector 504, is stored in a memory at a location corresponding to a block, 505, which is found by an offset from the current block 501 by the momentum candidate vector 506. At this stage there is insufficient history to generate or store an acceleration candidate.

FIG. 6 shows the second frame in the sequence. A block, 601, now contains the object, 602, which was located in pixel area 603 in the previous frame. In this case the momentum candidate is not useful, since it incorrectly predicted the position of the object to be block 604 and was therefore stored in that location. This candidate is not available during motion estimation of block 601, and is unlikely to have provided a good block match anyway, due to the change in direction of motion. Again, we assume that motion estimation for block 601 was successful, producing the motion vector 605 which accurately describes the motion of the object, from pixel area 603 in the previous frame to block 601 in the current frame. A momentum candidate vector is stored at a location corresponding to the block, 607, that is offset from the current block position by the momentum candidate vector, 606.

There is now enough information available to compute an acceleration candidate for the next frame. The current motion vector, 605, is compared with the vector 608 that was computed for the block 603 in the previous frame. The location of block 603 is known, as it is the block corresponding to, or closest to, the pixel area that was matched with the current block to produce the motion vector, 605. In other words, the vector 608 can be retrieved from the motion vector field determined for the previous frame, at a location which is offset backwards from the position of the current block 601, by the motion vector of the current block 605. The change in motion vector, 609, is then calculated, and is added to the current motion vector to produce an acceleration candidate, 610, that attempts to predict the position of the object in the next frame. The acceleration candidate is stored in a location corresponding to a block 611, which is offset from the current block location, 601, by the acceleration candidate vector, 610.

FIG. 7 shows the third frame in the sequence. A block, 701, contains the object, 702, which was located at pixel area 703 in the previous frame. During processing of the previous frame, motion estimation at the location corresponding to block 703 (marked 601 in FIG. 6) caused a momentum candidate to be stored at a position corresponding to block 704, and an acceleration candidate to be stored at a position corresponding to block 701. During motion estimation for block 701, the acceleration candidate, 705, is found to give a good block match, accurately describing the motion of the object from pixel area 703 in the previous frame to block 701 in the current frame. The acceleration candidate is therefore highly likely to be selected as the motion vector for the block. The acceleration candidate, passed forward from the previous frame, has accurately predicted the motion of the object, and has provided a useful vector candidate where previously no such candidate may have existed. The quality and accuracy of motion estimation is therefore improved. As before, a vector representing the change in motion, 706, is calculated, and is added to the motion vector 705 to produce a new acceleration candidate vector 707 which is stored at a position 708 offset from the current block by the size of the acceleration candidate vector. Similarly a momentum candidate is stored at position 709.

To extend the system to higher orders of motion, additional motion vector history is required in order to determine the way in which the motion is changing over time. The system is concerned with predicting the positions and motion of objects, and so it is necessary to follow motion vectors backwards through the sequence of previous motion vector fields in order to track the positions of objects. Each step backwards through the sequence of previous motion vector fields takes a motion vector from the current field and uses it to determine a location in a previous field. For example, in FIG. 7, the current block is 701, and the associated vector is 705. Using this vector as a backwards offset indicates that the object's previous position was in block 703. Referring to FIG. 6, the same block is shown as 601. The vector at this location is 605, and using this vector as a backwards offset indicates that the object's previous position was in block 603. In FIG. 5, the same block is shown as 501. A similar backwards step uses vector 504 to determine that the previous location of the object was block 503. Given accurate vectors, an object's motion can be tracked backwards for as many frames as there are stored vector fields. The motion vectors at each of these positions then provide a history of movement for a particular object, and can be used to predict the position of that object in the future.

FIGS. 4 to 7, and also FIG. 8, not yet described, show a block sized object moving and accelerating such that it remains aligned to block locations in each frame. This is for clarity of illustration. Objects may be larger than single blocks and motion vectors are rarely simple multiples of the block sizes. The storage location for a momentum or acceleration candidate is determined by using a motion vector as an offset from the current block position. Similarly, when computing an acceleration vector it is necessary to retrieve motion vectors computed for blocks in the previous frame, for example from the location of block 603 in the example of FIG. 6 and from the location of block 703 in the example of FIG. 7. The position of these blocks is also determined by using a motion vector to create an offset from the current block position. Locations determined in this way will generally not be aligned to whole block positions, so a practical system needs a method to determine the appropriate block locations. One suitable method is to determine which pixel a vector candidate points to, and to store the candidate in the parent block of that pixel. In other words, to round the storage location for a candidate to the nearest whole block location. This is generally sufficient to track object movements. The natural tendency of most motion estimation systems to propagate a good vector into nearby blocks means that a good momentum or acceleration candidate will "snap" back onto the object being tracked. A system may also choose to add additional robustness by considering momentum and acceleration candidates from neighbouring block locations, as well as from the current block, when performing motion estimation. Alternatively, where an acceleration or momentum candidate vector is such as to indicate a storage location midway between two blocks, a system may choose to store the candidate in both locations. When retrieving motion vectors from a previous frame, an alternative to rounding may be to interpolate the vector field at the required location.

It is important to note that vector fields are not uniform. Motion vectors may diverge in some areas and converge in others. This can result in more than one momentum or acceleration candidate being stored in a single block, and for some blocks there may be no candidates stored. FIG. 8 illustrates a situation resulting in multiple candidates per block using momentum candidates as an example. Motion estimation for block 801 in the current frame finds a match for object 802 from pixel area 803 in the previous frame, and so produces motion vector 804. Motion estimation for block 807 in the current frame finds a match from pixel area 808 in the previous frame, and so produces motion vector 809. Momentum candidates 806 and 810 are therefore stored at positions offset from their origin blocks by the motion vector. In this case both momentum vectors will request to be stored in block 805. A similar situation may also exist when storing candidates of higher order, e.g. acceleration candidates.

A system must decide how to manage multiple candidates requesting storage at the same location, as storage space may be limited. Where space is available to store multiple candidates, and where there are sufficient computational units available to test them during motion estimation, there is no limit to the number that may be stored and subsequently used. In a practical system it is more likely that only a small number of momentum/acceleration candidates will be stored at a given block location, e.g. 1, 2, or 4, and it is necessary to devise a method to prioritize candidates. For example, in a system with storage space for only one momentum candidate per block location, an empty location will always be filled by the first candidate that requests storage. If the system then attempts to store a second candidate at the same location, it must be decided whether to replace the first vector with the second, or to retain the first vector and discard the second. A SAD or MSD value gives a measure of the "quality" of a vector, so a reasonable way to reach such a decision may be to compare the results of the block matching processes that produced the two vectors, and to select the vector that originated with the best match.

FIG. 9 shows a block diagram of a motion estimation system used in a typical video encoder application. A video input 905 is supplied to a motion estimation unit 901 which compares blocks with those in a reference image 902 reconstructed from a previously encoded frame. This reference image 902 is stored in a memory 903. This motion estimation unit 901 produces a set of motion vectors 904 which, for each block in the respective field or frame of the input video sequence 905 gives the best match in deriving that block from the reference image 902. A motion compensation unit 906 uses the vectors to construct an approximation to the input frame or field from only the pixels of the reference image 902. The output of the motion compensation unit 906 is then compared with the respective field or frame of the input video signal 905 in a subtractor 907 to produce a residual or difference signal 908 for the image. This residual signal 908 is passed to a transform/quantization unit 909 and is then combined with the output of the motion estimation unit 901 in a bit stream encoder 910 to produce a bit stream output 912. The motion estimation unit 901 and the transform quantization unit 909, together with the reference image 902, form the inputs to a reconstruction unit 911 which is used to reconstruct a frame for storage in memory 903 for comparison in the motion estimation unit 901 with the following field or frame of the video signal. This is, therefore, a conventional motion estimation scheme used in a video encoder. The system of momentum and acceleration vector candidates according to the invention may be considered to improve the performance of the motion estimation unit 901.

Applications which require accurate representation of the true motions of objects in the video include frame rate conversion and de-interlacing. A frame rate conversation application is shown in FIG. 10. Frame rate conversion may be used, for example, to convert a video sequence at 60 frames per second to a higher rate of 120 frames per second. This is achieved by interpolating an additional frame at a time instance midway between each pair of input frames. In FIG. 10, the system comprises a video input 1001 which goes to a memory 1002 to store the input frame history and also to a motion estimation unit 1003 which performs motion estimation by comparing the current input frame from the video input 1001 with a previous frame from the memory 1002. Motion vectors are sent to an interpolation unit 1004 which constructs an interpolated frame from the input frames and provides a video output 1007. Knowing the motion vectors allows the interpolation unit 1004 to place pixels such that objects in the interpolated frame appear in the appropriate positions according to the trajectory of their motion. Frame rate conversion may also perform conversion with a non-integer frame rate ratio, e.g. 24 frames per second to 60 frames per second. In this case, the time instances of the interpolated frames vary and are not exactly midway between the input frames. A timing control unit 1005 provides the appropriate scaling factors to allow the interpolation unit to create the correct output. An image analysis unit 1006 may also analyse the input data and monitor the performance of the system. For example, it may provide error concealment by adjusting the behaviour of the timing control. Frame rate conversion and de-interlacing rely heavily on high quality motion vectors representing the true motion of objects, if those objects are to be represented at the correct positions in the output frames or fields. A system using momentum and acceleration vector candidates takes advantage of knowledge of the way that real objects behave in order to provide the motion estimator with vector candidates that are highly likely to be representative of the true motion in the video.

FIG. 11 shows a more detailed block diagram of a conventional block based motion estimator of a type that may be used in the systems of FIG. 9 or FIG. 10. This comprises a motion vector memory 1101 which includes a set of motion vectors 1102 derived from a previous frame and a set of motion vectors 1103 derived from those parts of a current frame that have already been processed. Motion estimation of a block in the current frame occurs under the control of a block sequencer 1104. A candidate generation unit 1105 selects vectors from the motion vector memory 1101 according to a pattern which attempts to exploit temporal and spatial consistency of the vector field in order to provide suitable motion vector candidates for the block. The candidate generation unit 1105 may also introduce a degree of randomness in the vectors, which will allow a vector field to adapt and converge on new motions as processing proceeds. Addresses are supplied to a video memory 1107 containing previous frame data 1108 and current frame data 1109, such that the pixel data returned by the memory is offset from the current block location according to each vector candidate. The pixel data from each frame is provided for comparison in a pixel data comparison unit 1110. The output of this is a sum of absolute differences value which is provided to a best vector selection unit 1106 which uses this data to identify which of the vector candidates from the candidate generation unit 1105 gives the best match in deriving one frame from another at that block location. The best vector selection unit 1106 then provides the selected vector to the current frame motion vectors 1103 in the motion vector memory 1101.

FIG. 12 shows a block diagram of a motion estimator which also provides for momentum and acceleration candidate vectors for a block. This is a modified version of the circuitry of FIG. 11 and units which are the same in both circuits share the same reference numbers. The motion vector memory 1101 includes a set of motion vectors 1206 derived from a number of previous frames, and a set of motion vectors 1103 derived from those parts of a current frame that have already been processed. In addition, the motion vector memory 1101 includes a block of current frame momentum/acceleration motion vector candidates 1201 and a set of next frame momentum/acceleration candidates 1202. The candidate generation unit 1105 will now include momentum and acceleration candidates from the memory 1101, in addition to candidates selected according to the methods described in relation to FIG. 11. Momentum candidate vectors for use in motion estimation of the next frame are generated after best vector selection in the selection unit 1106 in a momentum candidate generation unit 1203. This generates momentum vector candidates in accordance with the method described in relation to FIG. 4 and these are then stored in the next frame momentum/acceleration candidate block 1202. When the following frame is processed, they are transferred to the current frame momentum/acceleration candidate block 1201.

Acceleration candidate vectors for use in motion estimation of the next frame are generated in an acceleration candidate generation unit 1204 which is also coupled to the output of the best vector selection unit 1106 and generates acceleration candidates in accordance with the method described in relation to FIGS. 5 to 7. These are also stored in the next frame momentum/acceleration candidate block 1202 before they are transferred to the current frame momentum/acceleration candidate block 1201 in the motion vector memory 1101. The system is also able to generate higher order candidates if so desired and a number of further candidate generation blocks (shown generally at 1205) corresponding to the number of higher order candidates required can be provided.

The invention claimed is:

1. A method for motion estimation in a sequence of video images, comprising:
   a) subdividing each field or frame of a sequence of video images into a plurality of blocks;
   b) assigning to each block in each video field or frame a respective set of candidate motion vectors;
   c) determining for each block in a current video field or frame, which of its respective candidate motion vectors produces a best match to a block in a previous video field or frame;
   d) forming a motion vector field for the current video field or frame using the thus determined best match vectors for each block;
   e) forming a further motion vector field by, for each block in a current field or frame, storing a further motion vector derived from the best match vector for that block at a block location offset by a distance determined based on said further motion vector; and
   f) repeating steps a) to e) for a following video field or frame, wherein the set of candidate motion vectors assigned at step b) to a respective block in the following video field or frame includes said further motion vector stored at that block location at step e) during the current video field or frame.

2. A method according to claim 1, wherein the further motion vector stored at step e) is derived from the best match vector, and predicts a future position and motion of an object in the sequence of video images that continues to travel with unchanged velocity.

3. A method according to claim 1, wherein the further motion vector stored at step e) is further derived from a vector from each of one or more of the motion vector fields previously formed at step d).

4. A method according to claim 3, wherein the further motion vector stored at step e) is derived from the best match vector and a vector from one motion vector field previously formed at step d), and predicts a future position and motion of an object in the sequence of video images that has a velocity changing at a constant rate.

5. A method according to claim 3, wherein the further motion vector stored at step e) is derived from the best match vector and a vector from more than one of the motion vector fields previously formed at step d), and predicts a future position and motion of an object in the sequence of video images where a derivative of the velocity of the object is changing at a constant rate.

6. A method according to claim 3, wherein each vector from a previous motion vector field is fetched by:
   stepping backwards through a sequence of previous motion vector fields, and
   at each step, fetching a vector from a location offset backwards by a distance derived from the motion vector fetched from the current motion vector field in the sequence.

7. A method according to claim 6, wherein the vector fetched from the current motion vector field in motion the sequence points to a location not aligned with a block, and the offset backwards location is derived by rounding the location not aligned with a block to the nearest block.

8. A method according to claim 6, wherein the motion vector fetched from the current motion vector field in the sequence points to a location not aligned with a block, and the vector fetched from the offset backwards location in the previous motion vector field is interpolated from the vectors at whole block positions.

9. A method according to claim 1, further comprising storing multiple candidate motion vectors at each offset block location.

10. A method according to claim 9, wherein multiple candidate motion vectors are stored at each offset block location using a priority system.

11. A method according to claim 10, wherein the priority system includes:
   storing a metric representing the quality of the best match obtained in step c) at the offset block location for the further motion vector derived from that best match vector and stored at step e); and
   selecting the further motion vector for storing according to the stored quality metric, such that the further motion vectors selected for storing are the vectors having stored quality metrics indicating highest reliability.

12. A method according to claim 1, wherein, at step e), the further motion vector points to a location not aligned with a block, and the offset block location at step e) is derived by rounding the location not aligned with a block to the nearest block.

13. A method according to claim 1, wherein, at step e), the further motion vector points to a location not aligned with a block but close to block boundaries, and the offset block location at step e) comprises more than one block location adjacent to the boundaries.

14. An apparatus for motion estimation in a sequence of video images, comprising:
   a field or frame subdivider configured for subdividing each field or frame of a sequence of video images into a plurality of blocks;
   a candidate motion vector assignor for assigning to each block in each video field or frame a respective set of candidate motion vectors;
   a selector configured for determining for each block in a current video field or frame, which of its respective candidate motion vectors produces a best match to a block in a previous video field or frame offset by each candidate vector;
   a first motion vector field former configured for forming a motion vector field for the current video field or frame using the thus determined best match vectors for each block; and
   a second motion vector field former configured for forming a further motion vector field by, for each block in a current field or frame, storing a further motion vector derived from the best match vector for that block at a block location offset by a distance based on said further motion vector,
   wherein, when the apparatus operates on a video field or frame following the current video field or frame, the set of candidate motion vectors assigned at the candidate motion vector assignor to each block in the following video field or frame includes said further motion vector stored at each block location at the second motion vector field former during the current video field or frame.

15. The apparatus according to claim 14, wherein the further motion vector stored at the second motion vector field former is derived from the best match vector, and predicts a future position and motion of an object in the sequence of video images that continues to travel with unchanged velocity.

16. The apparatus according to claim 14, wherein the further motion vector stored at the second motion vector field former is further derived from a vector from each of one or more of the motion vector fields previously formed at the first motion vector field former.

17. The apparatus according to claim 16, wherein the further motion vector stored at the second motion vector field former is derived from the best match vector and a vector from one motion vector field previously formed at the first motion vector field former, and predicts a future position and motion of an object in the sequence of video images that has a velocity changing at a constant rate.

18. The apparatus according to claim 16, wherein the further motion vector stored at the second motion vector field former is derived from the best match vector and a vector from more than one of the motion vector fields previously formed at the first motion vector field former, and predicts a future position and motion of an object in the sequence of video images where a derivative of the velocity of the object is changing at a constant rate.

* * * * *